United States Patent
Yu et al.

(10) Patent No.: US 8,189,942 B2
(45) Date of Patent: May 29, 2012

(54) METHOD FOR DISCRIMINATING FOCUS QUALITY OF IMAGE PICKUP DEVICE

(75) Inventors: Chien-Nan Yu, Taipei (TW); Szu-Hao Lyu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 837 days.

(21) Appl. No.: 12/334,179

(22) Filed: Dec. 12, 2008

(65) Prior Publication Data

US 2010/0074547 A1     Mar. 25, 2010

(30) Foreign Application Priority Data

Sep. 19, 2008   (TW) ................................. 97135956 A

(51) Int. Cl.
*G06K 9/40*    (2006.01)
(52) U.S. Cl. ....................................................... 382/255
(58) Field of Classification Search .................. 382/255, 382/270, 271, 286, 100, 141, 152; 348/180, 348/181, 189, 192, 701, 722
See application file for complete search history.

(56) References Cited

U.S. PATENT DOCUMENTS

| | | | |
|---|---|---|---|
| 7,469,160 B2 * | 12/2008 | Banks et al. | 600/476 |
| 7,916,173 B2 * | 3/2011 | Clark et al. | 348/180 |
| 2007/0177860 A1 * | 8/2007 | Hooley et al. | 396/79 |

* cited by examiner

*Primary Examiner* — Yon Couso
(74) *Attorney, Agent, or Firm* — Kirton McConkie; Evan R. Witt

(57) ABSTRACT

A focus-quality judging method includes the following steps. Firstly, a comparing object including a target area is provided. A reference image pickup device is provided to shoot the comparing object to obtain a standard image including a standard target area image. Then, a first pixel number contained in the standard target area image is counted. The comparing object is shot by a test image pickup device to obtain a test image including a test target area image, wherein the test image has the same resolution as the standard image. Then, a second pixel number contained in the test target area image is counted. The first pixel number contained in the standard target area image is compared with the second pixel number contained in the test target area image. According to the comparing results, it is discriminated whether the test image pickup device performs an accurate focusing operation.

8 Claims, 3 Drawing Sheets

METHOD FOR DISCRIMINATING FOCUS QUALITY OF IMAGE PICKUP DEVICE

FIELD OF THE INVENTION

The present invention relates to a focus-quality judging method for discriminating focus quality of an image pickup device, and more particularly to a focus-quality judging method for discriminating focus quality of an image pickup device according to the pixel numbers of an image captured by the image pickup device.

BACKGROUND OF THE INVENTION

With increasing development of high technology industries, diverse electronic devices have experienced great growth. Especially, the electronic devices that can be used in our daily lives are now rapidly gaining in popularity, for example personal computers, mobile phones or image pickup devices. In order to achieve high image quality of the object, an auto focus method or a manual focus method is employed to adjust the focal length of the image pickup device. Generally, regardless of whether the auto focus method or a manual focus method is employed, a human visual recognition process or another image analysis process is utilized to discriminate whether the image pickup device accurately focuses on the object. For example, in a case that the image pickup device is a digital camera, the captured image of the object may be directly shown on the LCD screen of the digital camera and thus the user may discriminate the focusing efficacy with the naked eyes. On the other hand, after the image pickup devices are manufactured in the factory, the quality of the image pickup devices need to be tested. Since a huge number of image pickup devices are produced in the factory, the human visual recognition is both laboring and time-consuming. In addition, the human visual recognition is a very subjective because the naked eyes are readily tired after an extended use period. For efficiently discriminating focus quality of a large amount of image pickup devices, many image analysis techniques have been provided for the extraction of quantitative data from images.

Conventionally, there are several means for implementing focus value measurements. Take a histogram equalization method for example. By the histogram equalization method, the brightness values of the image are collected in terms of statistics, the probabilities of respective brightness values are plotted as a cumulative conversion curve, and the converted brightness values are obtained according to the cumulative conversion curve. FIG. 1 is an ideal curve plot for discriminating focus quality of an image pickup device according to the conventional histogram equalization method. The horizontal coordinate and the vertical coordinate denote brightness values and the pixel numbers, respectively. As shown in FIG. 1, since the horizontal coordinate at the right side is larger than that in the left side, the right-side horizontal coordinates are relatively brighter but the left-side horizontal coordinates are relatively darker. As shown in FIG. 1, the maximum pixel number ($B_{max}$) in the relatively darker region and the maximum pixel number ($W_{max}$) in the relatively brighter region correspond to brightness values $I_{PB}$ and $I_{PW}$, respectively.

According to the brightness values of $I_{PB}$ and $I_{PW}$, a focus coefficient $C_F$ is obtained by the equation: $C_F=(I_{PW}-I_{PB})/(I_{PW}+I_{PB})$.

In addition, the histogram equalization method has a predetermined standard focus coefficient $C_S$. The histogram equalization method may discriminate whether the image pickup device accurately focus on the object by comparing the standard focus coefficient $C_S$ with the focus coefficient $C_F$. If the focus coefficient $C_F$ is more than or equal to the standard focus coefficient $C_S$, the image pickup device is deemed to accurately focus on the object. Whereas, if the focus coefficient $C_F$ is less than the standard focus coefficient $C_S$, the focusing accuracy of the image pickup device is deteriorated and thus the focus quality is undesirable.

Since the histogram equalization method as shown in FIG. 1 is implemented by an image processing program, the focusing accuracy is usually affected by the environmental variables or some other factors in the practical operating situations. FIG. 2 is a real curve plot for discriminating focus quality of an image pickup device according to the conventional histogram equalization method. As shown in FIG. 2, the maximum pixel number ($W_{max}$) in the relatively brighter region corresponds to brightness value of $I_{PW}$. Whereas, in the relatively darker region, two peak pixel numbers having the same pixel number $B_{max}$ are obtained. Since these two peak pixel numbers having the same pixel number $B_{max}$ correspond to the brightness values $I_{PB}$ and $I_{PB}'$, the image processing program fails to realize which brightness value is chosen to determine the focus coefficient $C_F$. Moreover, since the brightness values of the pixels are influenced by the background light, the pixel umber $B_{max}$ corresponding to the brightness value $I_{PB}$ is possibly shifted to the adjacent pixel number $B_{max}+1$ or $B_{max}-1$. Under this circumstance, if the brightness value $I_{PB}$ corresponds to the pixel number $B_{max}-1$, the image processing program may acquire the brightness value $I_{PB}$ to calculate the focus coefficient $C_F$. Otherwise, if the brightness value $I_{PB}$ corresponds to the pixel number $B_{max}+1$, the image processing program may acquire the brightness value $I_{PB}$ to calculate the focus coefficient $C_F$. Therefore, the focus coefficient $C_F$ is usually erroneous and unreliable.

SUMMARY OF THE INVENTION

It is an object of the present invention to provide a focus-quality judging method for discriminating focus quality of a test image pickup device without being influenced by the background light beams.

In accordance with an aspect of the present invention, there is provided a focus-quality judging method for discriminating focus quality of a test image pickup device. Firstly, a comparing object including a target area is provided. A reference image pickup device is provided to shoot the comparing object to obtain a standard image including a standard target area image. Then, a pixel number $P_1$ contained in the standard target area image is counted. The comparing object is shot by the test image pickup device to obtain a test image including a test target area image, wherein the test image has the same resolution as the standard image. Then, a pixel number $P_2$ contained in the test target area image is counted. The pixel number $P_1$ contained in the standard target area image is compared with the pixel number $P_2$ contained in the test target area image. If $P_2$ is more than or equal to $P_1$, the test image pickup device is deemed to perform an accurate focusing operation. If $P_2$ is less than $P_1$, the test image pickup device is deemed to perform an erroneous focusing operation.

In an embodiment, both of the standard image and the test image are captured at resolution of 800×600.

In an embodiment, the reference image pickup device and the test image pickup device are cameras, digital cameras or video cameras.

In an embodiment, the comparing object is a photo, a paper or a document, and the target region is a picture included in the comparing object.

In accordance with another aspect of the present invention, there is provided a focus-quality judging method for discriminating focus quality of a test image pickup device. Firstly, a comparing object including a target area is provided. Multiple reference image pickup devices $D_1 \sim D_N$ are providing to shoot the comparing object to obtain multiple standard images $I_1 \sim I_N$, wherein the standard images $I_1 \sim I_N$ have respective standard target area images $T_1 \sim T_N$. Then, pixel numbers $P_1 \sim P_N$ contained in respective standard target area images $T_1 \sim T_N$ are counted. An arithmetic mean $P'_1$ of the pixel numbers $P_1 \sim P_N$ contained in respective standard target area images $T_1 \sim T_N$ is calculated. The comparing object is shot by the test image pickup device to obtain a test image including a test target area image, wherein the test image has the same resolution as the standard images. Then, a pixel number $P_2$ contained in the test target area image is counted. The arithmetic mean $P'_1$ of the pixel numbers $P_1 \sim P_N$ contained in respective standard target area images $T_1 \sim T_N$ is compared with the pixel number $P_2$ contained in the test target area image. If $P_2$ is more than or equal to $P'_1$, the test image pickup device is deemed to perform an accurate focusing operation. If $P_2$ is less than $P'_1$, the test image pickup device is deemed to perform an erroneous focusing operation.

In an embodiment, all of the standard images and the test image are captured at resolution of 800×600.

In an embodiment, the reference image pickup devices and the test image pickup device are cameras, digital cameras or video cameras.

In an embodiment, the comparing object is a photo, a paper or a document, and the target region is a picture included in the comparing object.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a focus-quality judging method for discriminating focus quality of a test image pickup device. For performing the focus-quality judging method, a standard image should be obtained at first. The standard image is used as a judge base for discriminating whether the test image pickup device accurately focuses on the object.

Figure 1:
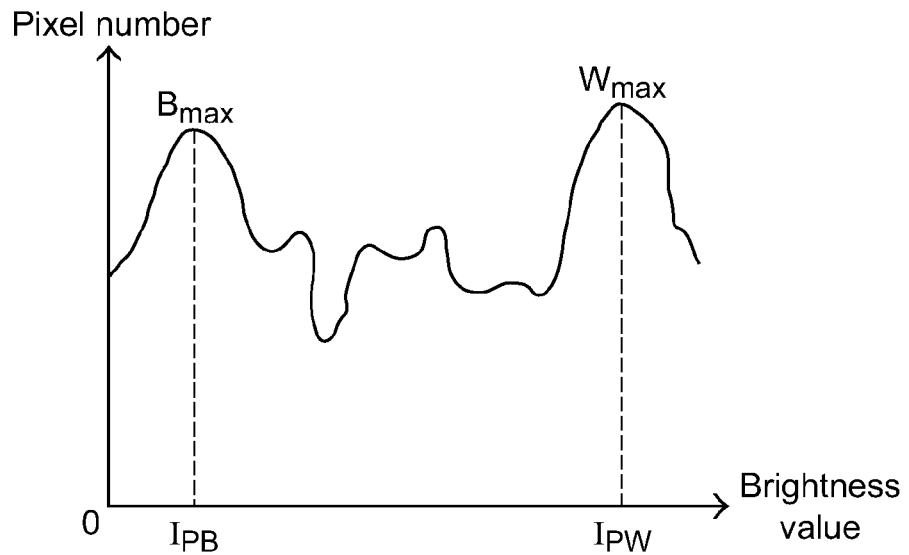
FIG. 1 is an ideal curve plot for discriminating focus quality of an image pickup device according to the conventional histogram equalization method.
Figure 2:
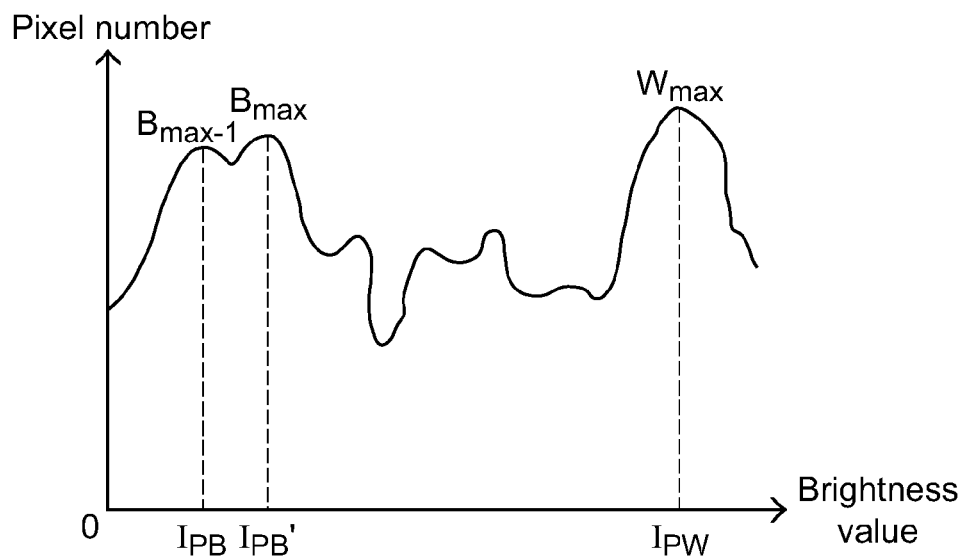
FIG. 2 is a real curve plot for discriminating focus quality of an image pickup device according to the conventional histogram equalization method.
Figure 3A:
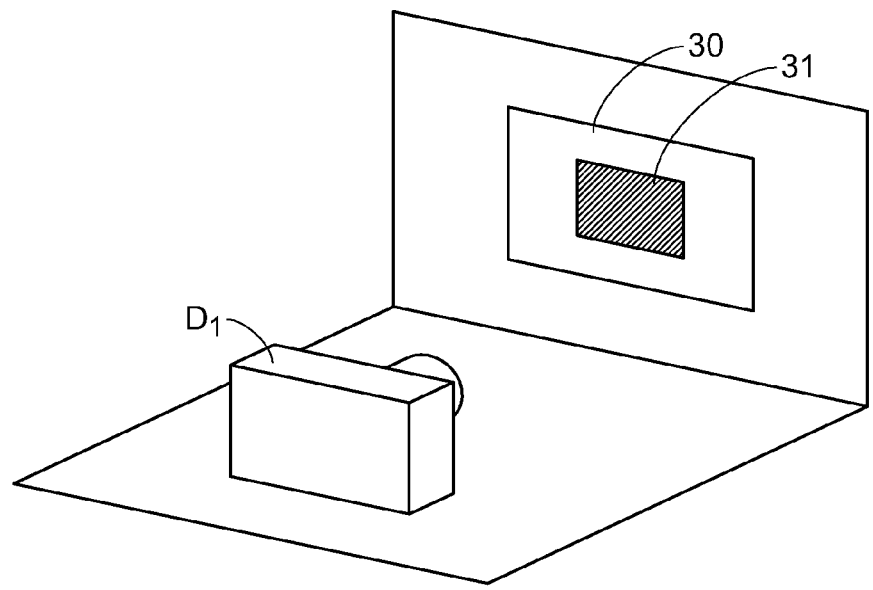
FIG. 3A is a schematic view illustrating the use of a reference image pickup device to capture a standard image.

Hereinafter, the focus-quality judging method for discriminating focus quality of a test image pickup device will be illustrated with reference to FIGS. 3A and 3B. FIG. 3A is a schematic view illustrating the use of a reference image pickup device to capture a standard image. As shown in FIG. 3A, a comparing object 30 including a target area 31 is shot by the reference image pickup device $D_1$, wherein the reference image pickup device $D_1$ focuses on the target area 31 of the comparing object 30. In this embodiment, the comparing object 30 is a document or a photo, and the target area 31 is a picture on the document or photo. The target area 31 has a rectangular shape or any arbitrary shape. After the comparing object 30 is shot by the reference image pickup device $D_1$, a standard image $I_1$ (as shown in FIG. 4) is captured at resolution of 800×600. The standard image $I_1$ includes a standard target area image $T_1$, which is indicative of the image of the target area 31. Next, the pixel number $P_1$ contained in the standard target area image $T_1$ is counted as a reference pixel number.

Figure 3B:
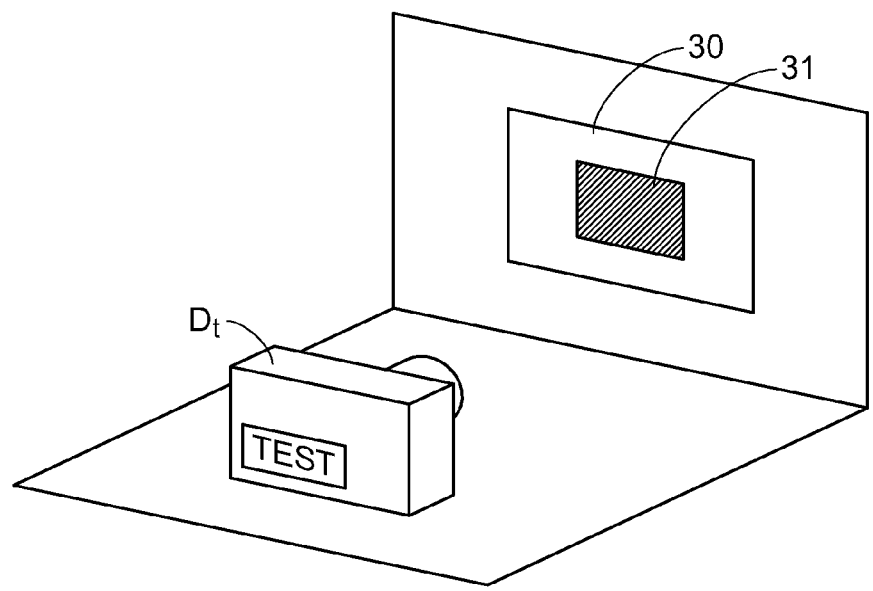
FIG. 3B is a schematic view illustrating the use of a test image pickup device to capture a test image.
Figure 4:
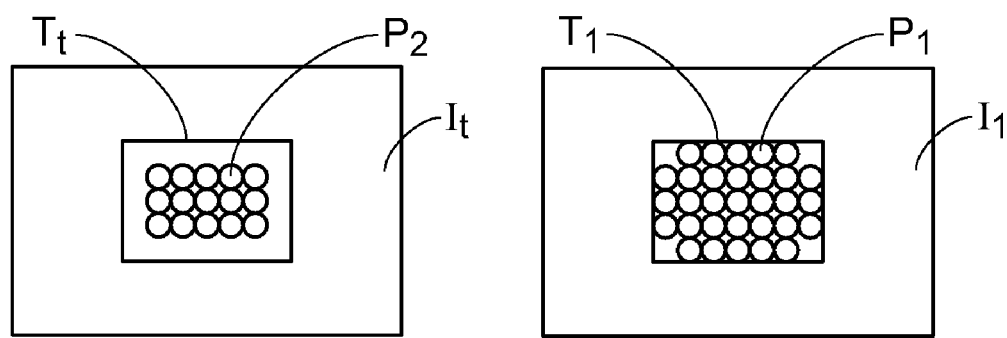
FIG. 4 schematically illustrates comparison of a standard image with a test image.

As shown in FIG. 3B, a test image pickup device $D_t$ is positioned at the same location as the reference image pickup device $D_1$. The comparing object 30 including the target area 31 is also shot by the test image pickup device $D_t$ at the same shooting angle as the reference image pickup device $D_1$. After the comparing object 30 is shot by the test image pickup device $D_t$, a test image $I_t$ (as shown in FIG. 4) is captured at resolution of 800×600. The test image $I_t$ includes a test target area image $T_t$. Next, the pixel number $P_2$ contained in the test target area image $T_t$ is counted. Next, the pixel number $P_1$ contained in the standard target area image $T_1$ is compared with the pixel number $P_2$ contained in the test target area image $T_t$ in order to test the focus quality of the test image pickup device $D_t$. If $P_2$ is more than or equal to $P_1$, the test image $I_t$ is deemed as a sharp image and thus an accurate focusing operation of the test image pickup device $D_t$ is rendered. Whereas, if $P_2$ is less than $P_1$, the test image $I_t$ is deemed as a blur image and thus an erroneous focusing operation of the test image pickup device $D_t$ is rendered. As shown in FIG. 4, since the pixel number $P_2$ contained in the test target area image $T_t$ is less than $P_1$, the test image $I_t$ is deemed as a blur image and the test image pickup device $D_t$ fails to accurately focus on the object.

In accordance with a key feature of the present invention, the edges of a sharp image are acuter than those of the blur image. In other words, the sharp image has a relatively large area and thus contains more pixels. In a case that a blur image is obtained, the edges thereof are possibly suffered from a bleeding problem and thus the blur image contains a less amount of pixels. It is noted that the test image and the standard image have the same resolution. By the method of the present invention, the focus quality of the test image pickup device is discriminated according to the pixel numbers of the standard image and the test image.

In the above embodiment, the comparing object 30 including the target area 31 is shot by the reference image pickup device $D_1$ to obtain a sharp standard image $I_1$, and the pixel number $P_1$ contained in the standard target area image $T_1$ is used as a judge base. It is noted that, however, those skilled in the art will readily observe that numerous modifications and alterations of acquiring the pixel number $P_1$ contained in the standard target area image $T_1$ may be made while retaining the teachings of the invention.

In an further embodiment of the present invention, the comparing object 30 is shot by multiple reference image pickup devices $D_1 \sim D_N$ to obtain respective standard images $I_1 \sim I_N$, wherein the standard images $I_1 \sim I_N$ have respective standard target area images $T_1 \sim T_N$. Next, the pixel numbers $P_1 \sim P_N$ contained in respective standard target area images $T_1 \sim T_N$ are counted. An arithmetic mean $P'_1$ of the pixel numbers $P_1 \sim P_N$ is used as a judge base for discriminating whether the test image pickup device accurately focuses on the comparing object. The operations of the reference image pickup devices $D_2 \sim D_N$ are identical to those of the reference image pickup device $D_1$, and are not redundantly described herein. In addition to the arithmetic mean, another central tendency value such as the median or the mode of the of the pixel numbers $P_1 \sim P_N$ may be also used as the judge base. The judge base may be chosen as required. For example, in a case that a large allowable tolerance is permitted, the central tendency value is used as the judge base. Whereas, in a case that high focus quality is desired for the professional photographer or hobby photographer, the relatively shaper images are selected as the standard images and the pixel numbers contained in the standard target area images are used as the judge base.

From the above description, the focus-quality judging method of the present invention is capable of discriminating focus quality of a test image pickup device without being influenced by the background light beams. Since the present invention utilizes the pixel numbers contained in the target area images as a judge base for discriminating whether the test image pickup device accurately focuses on the comparing object, the influence of the environmental variables on the focusing accuracy is minimized. Moreover, since the focus-quality judging method of the present invention only needs to test analyze the test target area image rather than the whole image, the process of discriminating the focus quality of the test image pickup device is time-saving in comparison with the prior art. As the testing time is reduced, the fabricating cost of the image pickup device is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A focus-quality judging method for discriminating focus quality of a test image pickup device, said focus-quality judging method comprising steps of:
   providing a comparing object including a target area;
   providing a reference image pickup device to shoot said comparing object to obtain a standard image including a standard target area image;
   using a computer to count a pixel number $P_1$ contained in said standard target area image;
   shooting said comparing object by said test image pickup device to obtain a test image including a test target area image, wherein said test image has the same resolution as said standard image;
   using the computer to count a pixel number $P_2$ contained in said test target area image; and
   using the computer to compare said pixel number $P_1$ contained in said standard target area image with said pixel number $P_2$ contained in said test target area image, wherein if $P_2$ is more than or equal to $P_1$, said test image pickup device is deemed to perform an accurate focusing operation, or if $P_2$ is less than $P_1$, said test image pickup device is deemed to perform an erroneous focusing operation.

2. The focus-quality judging method according to claim 1 wherein both of said standard image and said test image are captured at resolution of 800×600.

3. The focus-quality judging method according to claim 1 wherein said reference image pickup device and said test image pickup device are cameras, digital cameras or video cameras.

4. The focus-quality judging method according to claim 1 wherein said comparing object is a photo, a paper or a document, and said target region is a picture included in said comparing object.

5. A focus-quality judging method for discriminating focus quality of a test image pickup device, said focus-quality judging method comprising steps of:
   providing a comparing object including a target area;
   providing multiple reference image pickup devices $D_1 \sim D_N$ to shoot said comparing object to obtain multiple standard images $I_1 \sim I_N$, wherein said standard images $I_1 \sim I_N$ have respective standard target area images $T_1 \sim T_N$;
   using a computer to count pixel numbers $P_1 \sim P_N$ contained in respective standard target area images $T_1 \sim T_N$;
   using the computer to calculate an arithmetic mean $P'_1$ of said pixel numbers $P_1 \sim P_N$ contained in respective standard target area images $T_1 \sim T_N$;
   shooting said comparing object by said test image pickup device to obtain a test image including a test target area image, wherein said test image has the same resolution as said standard images;
   using the computer to count a pixel number $P_2$ contained in said test target area image; and
   using the computer to compare said arithmetic mean $P'_1$ of said pixel numbers $P_1 \sim P_N$ contained in respective standard target area images $T_1 \sim T_N$ with said pixel number $P_2$ contained in said test target area image, wherein if $P_2$ is more than or equal to $P'_1$, said test image pickup device is deemed to perform an accurate focusing operation, or if $P_2$ is less than $P'_1$, said test image pickup device is deemed to perform an erroneous focusing operation.

6. The focus-quality judging method according to claim 5 wherein all of said standard images and said test image are captured at resolution of 800×600.

7. The focus-quality judging method according to claim 5 wherein said reference image pickup devices and said test image pickup device are cameras, digital cameras or video cameras.

8. The focus-quality judging method according to claim 5 wherein said comparing object is a photo, a paper or a document, and said target region is a picture included in said comparing object.

* * * * *